July 13, 1943. BERTELI STELZER, NOW BY MARRIAGE BERTELI STELZER SHATTOCK Re. 22,348

HYDRAULIC BRAKE BOOSTER

Original Filed June 27, 1939 3 Sheets-Sheet 1

INVENTOR.

Berteli Stelzer

July 13, 1943. BERTELI STELZER, NOW BY MARRIAGE BERTELI STELZER SHATTOCK Re. 22,348

HYDRAULIC BRAKE BOOSTER

Original Filed June 27, 1939 3 Sheets-Sheet 2

INVENTOR.

Berteli Stelzer

July 13, 1943. BERTELI STELZER, NOW BY MARRIAGE BERTELI STELZER SHATTOCK Re. 22,348.
HYDRAULIC BRAKE BOOSTER
Original Filed June 27, 1939 3 Sheets-Sheet 3
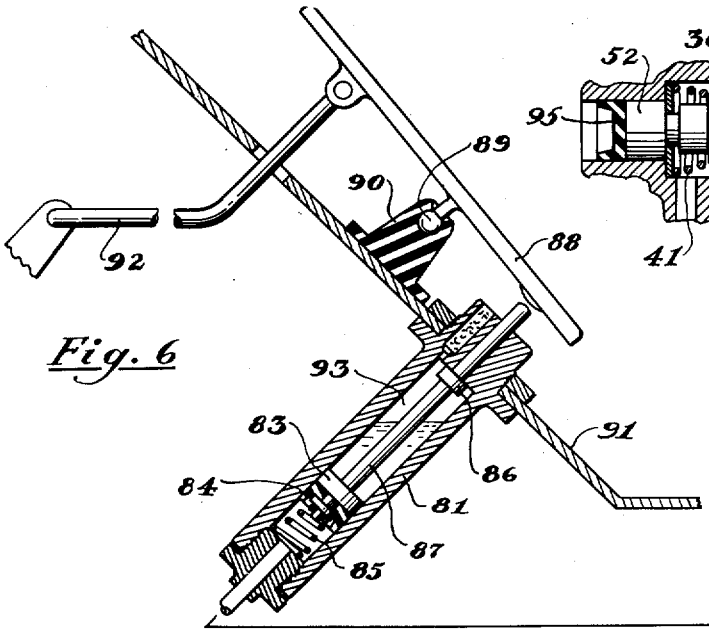
Fig. 6
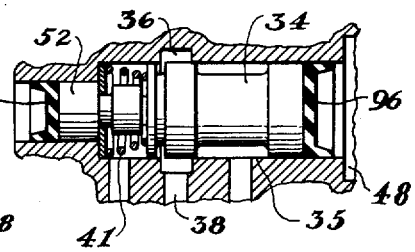
Fig. 7
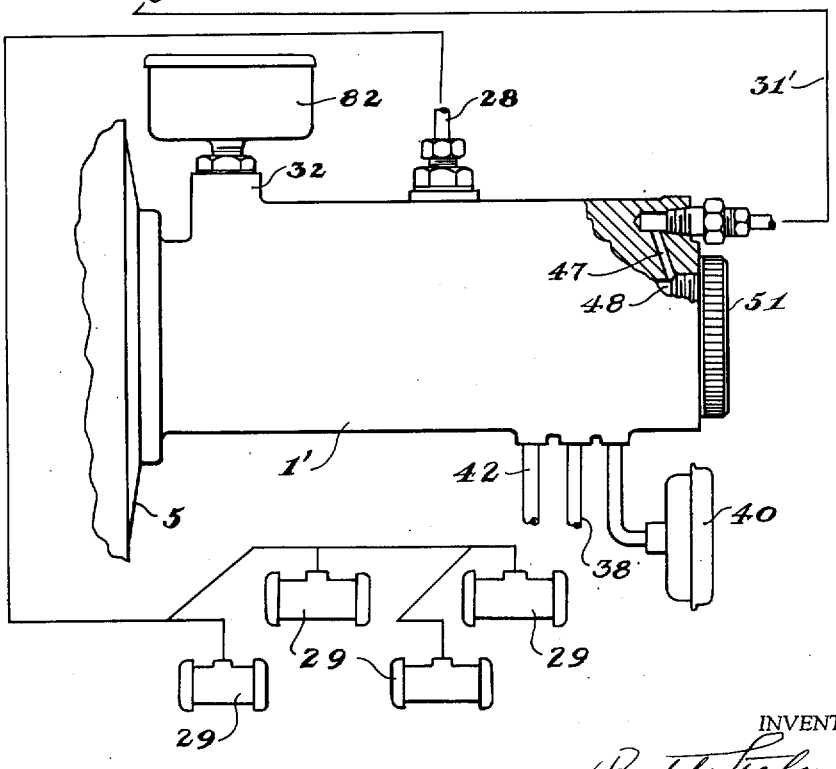
INVENTOR.
Berteli Stelzer Reissued July 13, 1943

Re. 22,348

UNITED STATES PATENT OFFICE 22,348

HYDRAULIC BRAKE BOOSTER

Berteli Stelzer, now by marriage Berteli Stelzer Shattock, St. Petersburg, Fla., assignor to William Stelzer, Detroit, Mich.

Original No. 2,260,490, dated October 28, 1941, Serial No. 281,375, June 27, 1939. Application for reissue October 20, 1942, Serial No. 462,774

24 Claims. (Cl. 188—152)

The invention relates to boosters for hydraulic braking systems in automotive vehicles and more particularly to a vacuum or air-operated power booster controlled by the fluid from the master cylinder.

The object of the invention is, first, to provide a power booster that may be placed anywhere on the vehicle and merely connected with the hydraulic brake lines, without disturbing the original setup of the brake pedal and master cylinder; and, second, to provide a booster acting in true proportion to the pedal pressure to effect "feel" of the brakes, accomplished by the introduction of a novel fluid operated differential pressure valve.

Another object is to provide a power braking system where the conventional brake pedal may be dispensed with and the brake more quickly applied by operation of the accelerator pedal.

Figure 1:
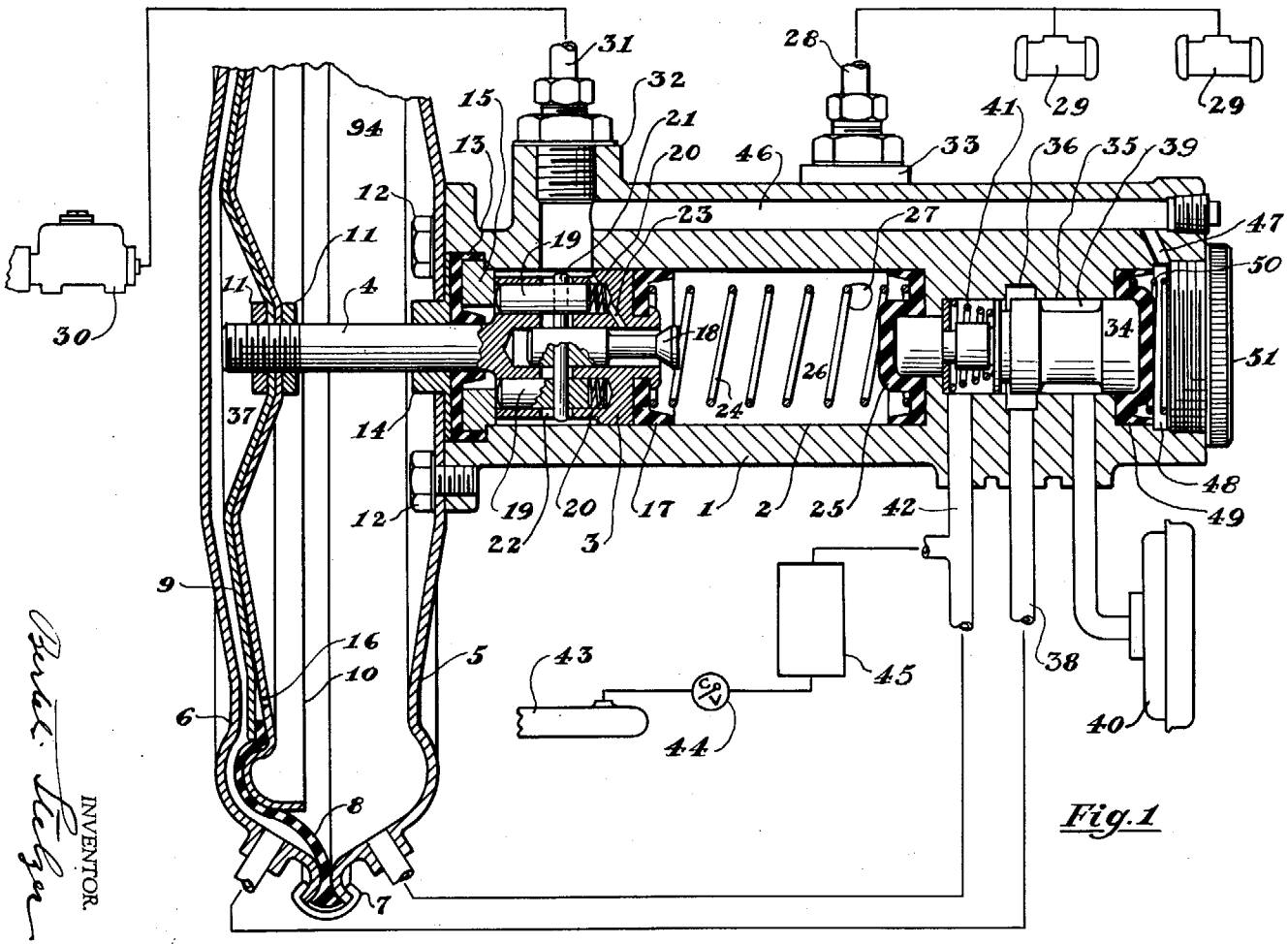
Figure 3:
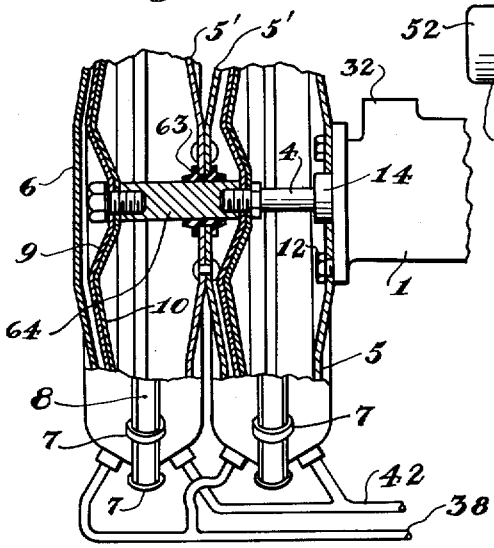
Figure 2:
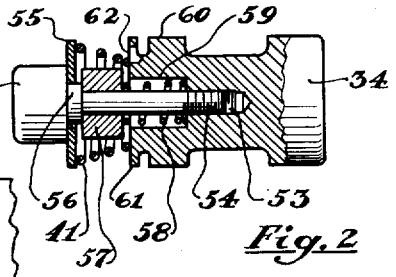
Figure 4:
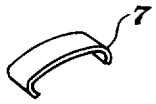
Figure 5:
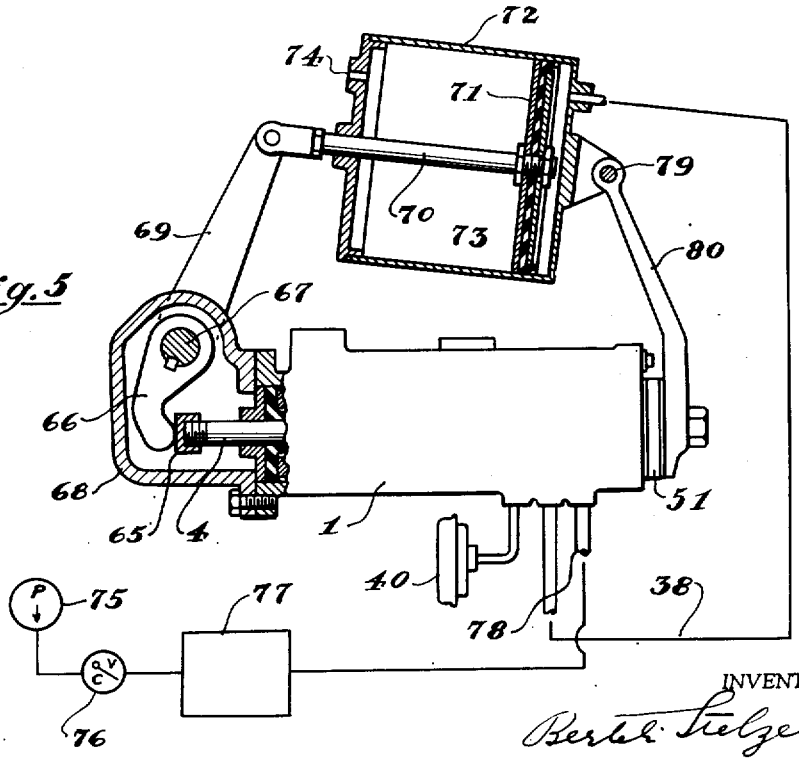

Other objects may appear by inspection of the drawings, wherein:

Fig. 1 is a diagrammatic sectional view of the hydraulic booster mechanism connected to illustrate the use of vacuum as a source of power;

Fig. 2, a sectional view of the differential valve plunger;

Fig. 3, a fragmentary view showing in section how a plurality of power cylinders may be used;

Fig. 4, a detail perspective view of a clip by means of which the shells making up the power cylinder are held together;

Fig. 5, a diagrammatic view of a modification illustrating the use of a conventional power cylinder of the sliding piston type in conjunction with the hydraulic booster, shown connected for use of compressed air as a source of power;

Fig. 6, a diagram showing a modified application of the hydraulic brake booster shown in Fig. 1, where the master cylinder merely operates the control valve; and Fig. 7, a sectional view of the valve showing conventional seals.

Referring now to Fig. 1, there is shown a hydraulic booster cylinder and valve housing 1 in whose cylinder bore 2 slides a piston 3 connected by its piston rod 4 to the piston of a diaphragm type power cylinder composed of shells 5 and 6 clamped together with clips 7, with a diaphragm 8 interposed, secured at its inner circle to the diaphragm piston composed of clamping or piston plates 9 and 10. The nuts 11 hold the plates together and secure them to said piston rod 4. The power cylinder is tightly bolted to the hydraulic booster cylinder 1 by bolts 12, and shell 5 serves to retain a seal 13, piston rod bearing 14, and piston stop 15. The cylinder shells and piston plates are preferably dished for greater strength, and so formed that the smallest volume exists between the diaphragm piston and shell 6. Plate 10 is provided with a hole 16 so that the atmospheric pressure acts on plate 9, whereby the latter not only serves as a clamping plate for the diaphragm, but also as a structural member of the piston, transmitting pressure to the piston rod 4. The hydraulic piston 3 has a piston seal 17 and is provided with a check valve 18 which is opened when the piston is in the "off" position, as shown in Fig. 1. For this purpose small plungers 19 are provided siding in holes against helical compression springs 20. A transverse pin 21 extends through these plungers 19 and the stem of check valve 18 so that they move in unison. A clearance hole 22 is provided for pin 21 in the piston, to allow the valve to close by virtue of springs 20 when the piston leaves the "off" position. A passage 23 allows flow of fluid through the piston when the valve is open. A return spring 24 yieldingly urges the piston toward its "off" position, and at the same time retains the valve diaphragm 25 in position, which seals off chamber 26 of the cylinder. This chamber communicates through passage 27 and conduit 28 with the wheel cylinders 29. The other end of the cylinder which is sealed against the power cylinder by seal 13, is connected to the master cylinder 30 by conduit 31 secured to inlet boss 32. For conduit 28, an outlet boss 33 is provided, so that it communicates with chamber 26. To automatically control the supply of power to the power cylinder, a novel differential pressure valve is incorporated consisting of two diaphragms of different area acting against each other and operating a valve plunger or piston to direct power to the power cylinder. The valve plunger 34 is accurately fitted to slide in the bore 35, so as to open groove 36 either to vacuum or to atmospheric pressure. Groove 36 communicates with chamber 37 of the power cylinder by means of a conduit 38, chamber 39 formed by a groove in the valve plunger 34 is open to the atmosphere, 40 designating an air cleaner. The chamber in which spring 41 is located communicates through conduit 42 with the source of power, such as for instance the intake manifold 43 of an internal combustion engine, with a check valve 44 and reservoir 45 interposed. In conjunction with Diesel engines, a vacuum pump would be used. To simplify the construction, the above-mentioned diaphragms of different area work directly against the valve plunger, and at the same time serve as seals. The area of the plunger where it engages the diaphragm is the effective area on which the pressure acts, and the desirable proportion of the areas is approximately 1:2.5. The low pressure produced by the master cylinder 30 is communicated through drilled passages 46 and 47 to chamber 48, acting on the diaphragm or seal 49 held on its seat by a spring 50 retained by the sealing plug 51. The plunger itself is of a novel construction shown in detail in Fig. 2. It is rendered adjustable by making the plunger of two pieces, 34 and 52, the tapped hole 53 receiving the threaded end 54. The spring 41 acting on a disc 55 slidable on shoulder 56, a slidable collar 57, and a helical coil spring 58 in recess 59 are placed intermediate said plunger parts 52 and 34. The conical spring 41 serves to place the valve plunger 34 into its "off" position when the pressure in the master cylinder is below a certain limit, whereby no power is supplied to boost the hydraulic pressure to the wheel cylinders 29. This spring is preferably sufficiently strong to resist the pressure produced by the master cylinder until the brake shoes are brought into contact with the brake drum. The second internal spring 58 is considerably lighter, and serves to increase the resistance to the movement of the plunger towards the "on" position exactly when shoulder 60 of plunger 34 registers with the annular groove 36. Another shoulder 61 merely serves as a guide for the valve plunger, and the passage of air is permitted by one or a plurality of holes 62.

Referring now to Fig. 3, there is shown how the outside diameter of the power cylinder may be decreased or the power capacity increased. This is accomplished by placing two cylinders in tandem. Shell 6 is placed on the outside, and the dividing wall between the two cylinders is made up of two shells 5' riveted together, with a rubber seal 63 in the center of which slides a piston rod extension 64 rigidly interconnecting the two diaphragm pistons.

In the modification in Fig. 5 the diaphragm cylinder is replaced by a power cylinder of the sliding piston type, and the hydraulic booster cylinder and valve unit is maintained in the form shown in Fig. 1. The end of the piston rod 4 is covered with a cap 65 engaging the cam lever 66 keyed to a shaft 67 turning in a housing 68 bolted to cylinder 1. A lever 69 rigid with shaft 67 engages the end of the piston rod 70 to which is secured the piston 71 of the power cylinder 72. Chamber 73 of this power cylinder is open to the atmosphere at 74. By way of example, and applicable also to Fig. 1, this system is shown connected to a source of power using fluid pressure, such as compressed air, where 75 designates an air compressor or pump, 76 a check valve, and 77 a reservoir. The air cleaner is connected to the chamber in which spring 41 is, and the pressure line 78 is connected to communicate with chamber 39. The power cylinder is pivotally supported at 79 by a bracket 80 rigidly secured to the end plug 51, or directly to cylinder 1. The hydraulic connections 31 and 28 are exactly the same as already shown in Fig. 1, and are therefore not repeated.

In the modification shown in Fig. 6 the novel device is shown connected purely for power braking, and instead of the usual master cylinder a special master cylinder 81 is used serving merely to apply the control valve. The hydraulic brake booster unit as shown in Fig. 1 is maintained, except that passage 46 is not drilled through, and line 31' is connected only with chamber 48. To the inlet 32 is conveniently connected a brake fluid reservoir 82 open to atmospheric pressure. In order not to encumber the drawing, this reservoir has been shown diagrammatically and is therefore out of proportion. The valve operating or master cylinder 81 has a piston 83 with a piston seal 84 urged to the starting or release position by a conical spring 85, the release position being determined by the shoulder or collar 86 on piston rod 87 which slidably extends through the upper portion of the cylinder so that it may be depressed by operation of the accelerator pedal 88. The latter is pivotally supported at 89, 90 designating a bracket secured to the toe board 91 of an automotive vehicle, and 92 the accelerator rod leading to the throttle of an internal combustion engine. The upper chamber 93 in the cylinder may serve as a reservoir for the operating fluid. In order to reduce the effort of the operator to apply the brakes, the diameter of cylinder 81 is considerably smaller than that of the valve plunger 34.

In Fig. 7 the proportion of the valve housing is somewhat modified to accommodate conventional seals 95 and 96 which take the place of seals 25 and 49, respectively.

Considering the construction in Fig. 1 in operation, and the hydraulic system filled with brake fluid, depression of the brake pedal by the operator and application of master cylinder 30 forces brake fluid from the master cylinder through line 31, passage 23, as well as past the piston seal 17 into chamber 26, and from there through passage 27 and line 28 to the wheel cylinders, expanding the brake shoes and bringing them into contact with the brake drums. As the only resistance to this operation is offered by the brake shoe retraction springs, the effort is small and the hydraulic pressure consequently low, so that the fluid acting on diaphragm 49 does not overcome spring 41. However, as the brake shoes begin to engage the drums the resistance to further expansion increases and the hydraulic pressure builds up, whereby due to the difference in area of the valve diaphragms the plunger 34 is moved to compress spring 41 and to close the passage between groove 36 and line 42. When the plunger 34 has reached a position where shoulder 60 registers with groove 36, so that line 38 is completely shut off both from line 42 and atmospheric chamber 39, an additional resistance comes into play. This becomes evident by inspection of Fig. 2. At this point disc 55 has come into contact with collar 57, so that plunger 34 pauses until the hydraulic pressure in the master cylinder is further increased. I call this the "holding" position. After the pressure has increased and the plunger has moved forward, communication is established between line 38 and the atmosphere. Now as both sides of the power cylinder have been previously evacuated, and chamber 94 of the power cylinder is permanently connected to the vacuum source, admission of air into chamber 37 forces the diaphragm piston 10 toward the hydraulic booster cylinder, moving piston 3 and compressing spring 24. As soon as piston 3 has moved a small distance away from stop 15, valve 18 closes by virtue of the light springs 20, and the pressure in chamber 26 is built up, it being the sum of the pressure produced by the master cylinder plus that produced by the power cylinder. When the hydraulic pressure in chamber 26 has reached a pre-determined multiple of that of the master cylinder 30, governed by the proportion of the effective areas of the valve diaphragm 25 and 49, and the counter-acting forces are again balanced, the springs 41 and 58 return the plunger 34 to its intermediate or "holding" position where shoulder 60 just closes off groove 36. The reason for the pause at this point is the elimination of spring 58 because collar 57 stops against shoulder 56. This novel arrangement is devised to prevent the fluctuation and oscillation back and forth of the valve plunger, thus preventing considerable waste of power as well as wear of the valve plunger. Upon retractile movement of the master cylinder 30, when the pressure behind piston 3 and in chamber 48 falls, the existing pressure in chamber 26 immediately returns the valve plunger to its original or "off" position, which is the position illustrated in Fig. 1. Thus chamber 37 is evacuated again, attaining the same static pressure as chamber 94, so that the pistons 3 and 10 are returned to the "off" position by spring 24, and the valve 18 is opened, permitting passage of fluid from the wheel cylinders 29 back to the master cylinder. Due to the small volume of chamber 37 in the "off" position, and to the arrangement which permits application of the brakes without movement of the booster pistons, resulting in a very short stroke, very little power is required. Chamber 94 serves as an effective reservoir, so that many brake applications may be made even after the engine has been stopped.

In the construction shown in Fig. 5 the same action takes place as already described in Fig. 1, except that application of the valve by fluid pressure from the master cylinder provides communication between lines 78 and 38, directing compressed air into cylinder 72, thus moving piston 71 and applying the booster. In the "off" position line 38 communicates with the atmosphere.

A considerably different function is obtained by the construction illustrated in Fig. 6, as in this case the device shown in Fig. 1 is not merely a booster but the only prime mover to apply the brakes. Depression of the accelerator pedal 88 by the operator, and consequent depression of piston 83 produces a pressure in line 31′ which is communicated to chamber 48, moving valve plunger 34 until line 38 communicates with the atmosphere and the power cylinder is applied as long as the pressure in chamber 26 does not exceed a certain multiple of the master cylinder pressure, as described in Fig. 1. The primary object of this construction is to provide quicker brake application and the elimination of the brake pedal.

The different embodiments have been shown to illustrate the multiplicity of constructions to which my invention may be applied, and I am aware that for instance the power cylinder may be connected in ways different from those shown, without departing from the principle of the invention, and the hydraulic brake booster may be used in conjunction with other hydraulic braking systems, or hydraulic transmissions constructed in a similar manner, the system illustrated has been shown merely by way of example.

I wish to make it understood that by the term "booster" I mean to designate a device which serves only as a helper, but does not do all the work. This is in contrast to the so-called power brake. I am aware that power brakes have been made with valve control depending on fluid pressure, and I do not wish to claim such a combination, the system on which I base my claims uses the manual effort of the operator to apply the brakes, and the effort of the booster is merely added or superimposed on said manual effort.

While three illustrative embodiments have been described in detail, it is not my intention to limit the scope of the invention to these particular embodiments, or otherwise than by the terms of the appended claims.

I claim:

1. In a hydraulic braking system for a vehicle having wheels, a master cylinder, wheel cylinders, a pressure booster to augment the hydraulic pressure in said wheel cylinders, fluid transmission means from said master cylinder to said pressure booster and from the latter to said wheel cylinders, a source of power to operate said pressure booster, valve means to direct power to said pressure booster, said valve means comprising a pair of relatively movable parts and being responsive to the hydraulic pressure produced by said master cylinder and the boosted hydraulic pressure in said wheel cylinders, whereby the hydraulic fluid from the master cylinder acts directly on one side of said valve means and the hydraulic fluid from the wheel cylinders acts directly on the other side of said valve means, and yielding means urging the parts of said valve means to a given relative position to cause said valve means to lock the power in said pressure booster under certain conditions.

2. In a hydraulic braking system for a vehicle having wheels, a manually operated hydraulic master cylinder, a power-operated hydraulic pressure booster, hydraulic fluid transmitting means between said master cylinder and said pressure booster, wheel cylinders to operate the brakes, hydraulic fluid transmitting means between said pressure booster and said wheel cylinders, said pressure booster being included to augment the hydraulic pressure directed to the wheel cylinders and to perform part of the work, and being constructed and arranged whereby the other part of the work is performed by said master cylinder, a valve to control the power with which the pressure booster is operated and arranged whereby the hydraulic fluid pressure from the master cylinder acts directly on one side of said valve and the hydraulic fluid pressure from the wheel cylinders acts directly on the other side of said valve, the first named side of said valve being of greater area than the other side of said valve, said pressure booster being distinct from said master cylinder and a unit in itself, so that it may be mounted at any convenient place in the vehicle without the use of mechanical linkage.

3. In a hydraulic braking system for a vehicle having wheels, a manually operated hydraulic master cylinder to produce a primary pressure, a power-operated hydraulic pressure booster to produce a secondary pressure, wheel cylinders to operate the brakes, hydraulic fluid transmitting means between said master cylinder and said hydraulic pressure booster, said pressure booster being constructed and arranged to superimpose said primary and secondary pressures to produce a resultant brake-applying pressure, hydraulic fluid transmitting means for conducting said brake-applying pressure from said pressure booster to said wheel cylinders, and valve means to direct power to said pressure booster and arranged whereby the hydraulic fluid from said master cylinder acts directly on one side of said valve means and the hydraulic fluid from the wheel cylinders acts directly on the other side of said valve means, the first named side of said valve means being of greater area than the other side of said valve means.

4. In a braking system for an automotive vehicle, a hydraulic pressure booster, a master cylinder operable by means of the accelerator pedal of said vehicle, wheel cylinders to apply the brakes, fluid pressure transmission means from said master cylinder to said pressure booster and from said pressure booster to said wheel cylinders, a source of power to operate said pressure booster, and valve means to direct power to said pressure booster, and arranged whereby the hydraulic fluid from the master cylinder acts directly on one side of said valve means and the hydraulic fluid from the wheel cylinders acts directly on the other side of said valve means, the first named side of said valve means being of greater area than the other side of said valve means, said pressure booster being constructed and arranged whereby it adds its force to the pressure generated by said master cylinder to provide a resultant brake-applying hydraulic pressure for operating the wheel cylinders, said booster and said valve means forming a single, self-contained unit, connected with the other parts of said braking system by said fluid pressure transmission means.

5. In a hydraulic braking system for a vehicle having wheels and wheel cylinders, a master cylinder operated by the operator to generate primary hydraulic pressure, a hydraulic pressure booster to augment said primary hydraulic pressure, a power cylinder to actuate said hydraulic pressure booster, a source of power for said power cylinder, fluid pressure transmitting means for conducting said primary pressure from said master cylinder to said hydraulic pressure booster, fluid pressure transmitting means for conducting the augmented hydraulic pressure from said booster to said wheel cylinders, and valve means to direct power from said source to said power cylinder, said valve means being arranged whereby the hydraulic fluid from said master cylinder acts directly on one side of said valve means to urge said valve means to increase the power directed to said power cylinder and the hydraulic fluid from said wheel cylinders acts directly on the other side of said valve means to urge said valve means to decrease the power directed to said power cylinder, the first named side of said valve means being of greater area than the other side of said valve means.

6. In a braking system for automotive vehicles, a hydraulic master cylinder operated by the operator, wheel cylinders to engage the brakes, a hydraulic pressure booster cylinder to augment the pressure in said wheel cylinders without increasing the hydraulic pressure in said master cylinder, hydraulic fluid transmitting means from said master cylinder to said pressure booster cylinder, hydraulic fluid transmitting means from said pressure booster cylinder to said wheel cylinders, a diaphragm type power cylinder co-axial with said hydraulic booster cylinder and adapted to operate said hydraulic booster cylinder, a source of power for said power cylinder, a valve to direct power from said source of power to said power cylinder, means responsive to the hydraulic pressure produced by said master cylinder to urge said valve to direct power to said power cylinder and to thereby boost the pressure in said wheel cylinders, means responsive to the hydraulic pressure produced in said wheel cylinders to urge said valve to decrease the power directed to said power cylinder, said means responsive to the hydraulic pressure opposing each other and being proportioned to obtain the desired ratio between master cylinder pressure and the boosted wheel cylinder pressure, whereby the hydraulic fluid from said master cylinder acts directly on one side of said valve and the hydraulic fluid from the wheel cylinders acts directly on the other side of said valve, said means responsive to the hydraulic pressure being engaged mechanically with said valve, means to provide a passage for the hydraulic fluid to flow from said wheel cylinders to said master cylinder when said booster cylinder is in the "off" position, and to provide passage of the hydraulic fluid from said master cylinder to said wheel cylinders when the pressure in said master cylinder is higher than in the wheel cylinders, said diaphragm type power cylinder, said hydraulic pressure booster cylinder, said valve, and said means responsive to the hydraulic pressure forming a single self-contained unit, connected to the other parts of said braking system by said hydraulic fluid transmitting means.

7. In a hydraulic braking system for a vehicle having wheels and wheel cylinders, a manually operated master cylinder for generating a brake-applying hydraulic pressure in the wheel cylinders, a hydraulic pressure increasing device to augment the hydraulic brake-applying pressure in said wheel cylinders and thus perform part of the work in applying the brakes, fluid pressure transmitting means from said master cylinder to said hydraulic pressure increasing device, fluid pressure transmitting means from said hydraulic pressure increasing device to said wheel cylinders, a source of power to operate said hydraulic pressure increasing device, a valve adapted to direct power to and from said hydraulic pressure increasing device to increase the hydraulic pressure in said wheel cylinders to a predetermined multiple of the hydraulic pressure in said master cylinder, said valve being arranged whereby the hydraulic fluid from said master cylinder acts directly on one side of said valve and the hydraulic fluid from said wheel cylinders acts directly on the other side of said valve, the first named side of said valve being of greater area than the other side of said valve.

8. In a braking system for automotive vehicles, a master cylinder operated by the operator, wheel cylinders to actuate the brakes, a hydraulic pressure booster in hydraulic communication with said master cylinder said booster being constructed and arranged to transmit to said wheel cylinders hydraulic braking pressure generated in the master cylinder, and to augment the hydraulic braking pressure in said wheel cylinders, a power device to operate said booster, a source of differential fluid pressure, a valve to control the connection of said power device with said source and with the atmosphere, a control piston responsive to the hydraulic pressure produced by said master cylinder to urge said valve to energize said power device to operate said booster and to thereby increase the hydraulic pressure in said wheel cylinders, and a smaller control piston responsive to the hydraulic pressure in said wheel cylinders, said control pistons being proportioned to obtain a boosted hydraulic braking pressure in said wheel cylinders which is a predetermined multiple of the hydraulic pressure in said master cylinder, said control pistons being connected mechanically with said valve and arranged whereby the hydraulic fluid from the master cylinder acts in one direction with respect to said valve and the hydraulic fluid from the wheel cylinders acts in the other direction with respect to said valve.

9. In a hydraulic braking system for a vehicle having a master cylinder, and wheels provided with brakes having operating cylinders therefor, a power-operated hydraulic booster for the braking system, said booster having fluid transmission means connecting it to the master cylinder and a fluid conduit connecting it to the brake cylinders, and control means for controlling the energization of said booster, said control means comprising a movable element directly and opposingly subjected to the hydraulic pressure in said fluid transmission means and to the hydraulic pressure in said conduit, said booster being constructed and arranged to utilize fluid pressure in said fluid transmission means to supplement the power developed by said power means for creating a brake-applying fluid pressure in said conduit, said control means having a greater area subjected to the pressure in said fluid transmission means than to the pressure in said conduit.

10. In a hydraulic braking system for a vehicle having a master cylinder, and wheels provided with brakes having operating cylinders therefor, a fluid pressure operated hydraulic pressure booster, hydraulic fluid transmitting means connecting said booster to the master cylinder and a fluid conduit connecting said booster to said wheel cylinders, said booster being constructed and arranged to transmit hydraulic pressure to the wheel cylinders from the master cylinder, and a control valve for said booster comprising a movable element directly and opposingly subjected to the hydraulic fluid pressure in the master cylinder and to the hydraulic fluid pressure in the wheel cylinders to control the energization of said booster, said booster being constructed and arranged to generate hydraulic pressure in the wheel cylinders in addition to the pressure transmitted thereto by the master cylinder to provide a resultant brake-applying hydraulic pressure, said movable element having a greater area subjected to the pressure in said fluid transmitting means than to the pressure in said conduit.

11. In a hydraulic braking system for a vehicle having a master cylinder to produce a primary pressure, and wheels provided with brakes having operating cylinders therefor, a power-operated hydraulic pressure booster to produce a secondary pressure, hydraulic fluid transmitting means connecting the master cylinder and said booster, hydraulic fluid transmitting means connecting said booster to the wheel cylinders, said booster being so constructed and arranged that the pressure of the hydraulic fluid is conducted from the master cylinder to said booster and superimposed on said secondary pressure to produce a brake-applying hydraulic pressure to be transmitted to the wheel cylinders through said last named transmitting means, control valve means constructed and arranged to be directly and opposingly subjected to the hydraulic pressure in the master cylinder and to the hydraulic pressure in the wheel cylinders to control the energization of said booster, said valve having a greater area subjected to the pressure in the master cylinder than to the pressure in the wheel cylinders.

12. In a hydraulic braking system for a vehicle having an accelerator pedal, wheels provided with brakes having operating cylinders therefor, and a master cylinder connected to the accelerator pedal, a power-operated hydraulic pressure booster having fluid-transmitting connection with the master cylinder and with the wheel cylinders, and control means constructed and arranged to be directly and opposingly subjected to the hydraulic pressure in the master cylinder and to the hydraulic pressure in the wheel cylinders to control the energization of said booster, said booster being constructed and arranged to superimpose the pressure generated thereby on the pressure generated in the master cylinder, said control means having a greater area subjected to the pressure in the master cylinder than to the pressure in the wheel cylinders.

13. In a hydraulic braking system for a vehicle having a master cylinder, and wheels provided with brakes having operating cylinders therefor, a hydraulic pressure booster having hydraulic fluid connection with the master cylinder and with the wheel cylinders, said booster comprising a power device, and control means for controlling the energization of said power device, said control means being constructed and arranged to be directly and opposingly subjected to hydraulic fluid pressure in the master cylinder and to hydraulic fluid pressure in the wheel cylinders whereby said power device will be energized in proportion to the hydraulic pressure in the master cylinder, said booster being so constructed and arranged that the force developed by the master cylinder will be combined with the force developed by said power device to produce a brake-applying hydraulic pressure in the wheel cylinders which will be a predetermined multiple of the hydraulic pressure in the master cylinder, said control means having a greater area subjected to the pressure in the master cylinder than to the pressure in the wheel cylinders.

14. In a hydraulic braking system for a vehicle having a master cylinder, and wheels provided with brakes having operating cylinders therefor, a conduit through which brake fluid is displaced upon manual operation of the master cylinder, and a pressure booster comprising a housing, a pressure-increasing device therein, said housing at one side of said pressure-increasing device being a secondary pressure chamber and communicating with the wheel cylinders, said conduit being in communication with said housing at the other side of said pressure-increasing device, a power device for delivering power to said pressure-increasing device, control means for said power device constructed and arranged to be directly and opposingly subjected to the respective hydraulic pressures in the master cylinder and in the wheel cylinders to control energization of said power device in accordance with pressures in the master cylinder, said pressure booster being constructed and arranged to afford communication between said conduit and the wheel cylinders and said housing at the last named side of said pressure increasing device when said power device is deenergized, to provide for the flow of hydraulic fluid between said conduit and the wheel cylinders, and means operative upon energization of said power device for preventing the flow of hydraulic fluid from said conduit to the wheel cylinders.

15. In a hydraulic braking system for a vehicle having a master cylinder, and wheels provided with brakes having operating cylinders therefor, a hydraulic pressure increasing device having hydraulic fluid connection with the master cylinder and with the wheel cylinders, a source of power for operating the pressure increasing device, said pressure increasing device being so constructed and arranged as to utilize the force developed by said power source for supplementing the pressure developed in the master cylinder to provide a resultant brake-applying hydraulic pressure in the wheel cylinders, a valve constructed and arranged to be directly and opposingly subjected to the hydraulic pressure in the master cylinder and to the hydraulic pressure in the wheel cylinders to control the connection of said power source to said pressure increasing device, said valve having a relatively large face and a relatively small face subjected respectively to hydraulic pressures in said master cylinder and in the wheel cylinders to cause said pressure increasing device to develop in the wheel cylinders a pressure which is a predetermined multiple of the pressure in the master cylinder.

16. In a hydraulic braking system for a vehicle having a master cylinder, and wheels provided with brakes having operating cylinders therefor, a hydraulic pressure booster in hydraulic communication with the master cylinder, a fluid pressure motor for operating said pressure booster, said booster being so constructed and arranged as to utilize the force developed by said motor for supplementing the pressure developed in the master cylinder to provide a resultant brake-applying hydraulic pressure in the wheel cylinders, a control valve for controlling differential pressures in said motor, and a pair of control pistons for controlling said valve, said pistons respectively having a relatively large and a relatively small area directly and opposingly subjected respectively to the hydraulic pressures in the master cylinder and in the wheel cylinders.

17. In a hydraulic braking system for a vehicle having a master cylinder, and wheels provided with brakes having operating cylinders therefor, a booster to augment the pressure in the wheel cylinders, said booster having hydraulic connection with the master cylinder and with the wheel cylinders and including a unit movable to create a brake applying hydraulic pressure and subject to hydraulic pressure in the master cylinder to tend to cause such movement, a power device coaxial with said pressure increasing device and having mechanical connection with said movable unit to assist in operating it, a control device for said power device constructed and arranged to be directly and opposingly subjected to the hydraulic pressure in the master cylinder and to the hydraulic pressure in the wheel cylinders to control energization of said power device, said control device having a greater area subjected to the pressure in the master cylinder than to the pressure in the wheel cylinders, said booster being constructed and arranged to provide for the direct flow of hydraulic fluid between the master cylinder and the wheel cylinders when said power device is deenergized, and to cut off direct communication between the master cylinder and the wheel cylinders when said power device is energized.

18. In a hydraulic brake system for a vehicle having a master cylinder, and wheels provided with brakes having operating cylinders therefor, a power booster mechanism formed as a unit separate and distinct from the master cylinder, said booster mechanism comprising a differential fluid pressure motor having a casing and a pressure responsive unit therein, a cylinder carried by said casing axially of said motor, a piston in said cylinder and movable toward one end thereof upon energization of said motor, said end of said cylinder being a pressure chamber, conduit means connecting said pressure chamber to the wheel cylinders, said piston and said pressure responsive unit being so arranged that movement of said pressure responsive unit is directly applied axially to said piston to effect movement thereof toward said end of said cylinder, conduit means connected at one end to the master cylinder, said booster mechanism having a chamber communicating with said last named conduit means to receive hydraulic fluid displaced from the master cylinder, said chamber being arranged to utilize hydraulic pressure in the master cylinder to assist said motor in moving said piston toward said end of said cylinder, and a control valve mechanism for controlling the energization of said motor, said valve mechanism having a relatively large area subjected to pressure in the master cylinder and a relatively smaller area oppositely subjected to pressure in the wheel cylinders, said conduit means forming the sole connections of said booster mechanism with the master cylinder and the wheel cylinders.

19. A hydraulic brake system for a vehicle having a master cylinder, and wheels provided with brakes having operating cylinders therefor, a power booster mechanism comprising a differential fluid pressure operated motor having a pressure responsive element movable axially with respect to said motor, a cylinder carried by one end of said motor axially thereof, a piston in said cylinder having mechanical connection with said pressure responsive element and movable toward one end of said cylinder upon energization of said motor, said end of said cylinder being a pressure chamber and communicating with the wheel cylinders, an element carried by said piston and having a normal position affording hydraulic communication between the master cylinder and the wheel cylinders when said motor is deenergized, said element being movable upon energization of said motor to close said hydraulic communication, and a control valve mechanism for said motor controlled in accordance with pressures in the master cylinder and in accordance with the relative degree of energization of said motor.

20. In a hydraulic brake system for a vehicle having a master cylinder, and wheels provided with brakes having operating cylinders therefor, a power booster mechanism comprising a differential fluid pressure operated motor having a casing and a pressure responsive unit therein, a cylinder carried by said casing in axial alignment with said motor, a piston reciprocable in said cylinder and having mechanical connection with said pressure responsive unit and movable toward one end of said cylinder by the direct application of force thereto by said pressure responsive unit upon energization of said motor, said end of said cylinder forming a pressure chamber communicating with the wheel cylinders, said booster mechanism having a chamber communicating with the master cylinder to receive fluid under pressure therefrom and constructed and arranged for the utilization of such pressure to assist said motor in building up pressure in said pressure chamber, a movable element carried by said piston and normally occupying a position establishing hydraulic communication between the master cylinder and the wheel cylinders and relatively movable upon energization of said motor to close such hydraulic communication, and control valve mechanism for said motor operable in accordance with pressure in the master cylinder and in accordance with the degree of energization of said motor to control energization of said motor.

21. In a hydraulic brake system for a vehicle having a master cylinder, and wheels provided with brakes having operating cylinders therefor, a power booster mechanism comprising a casing, a movable piston structure in said casing and dividing it into a pair of chambers one of which communicates with the master cylinder and the other of which is a pressure chamber, said piston structure comprising a pair of units having limited relative movement with respect to each other and normally occupying relative positions establishing hydraulic communication between the master cylinder and the wheel cylinders, said hydraulic communication being such as to afford relatively unimpeded transmission of hydraulic fluid from the master cylinder to the wheel cylinders upon initial operation of the master cylinder, said units being relatively movable to a second relative position in which said hydraulic communication is closed and from which relative position said units are bodily movable to generate pressure in said pressure chamber, a power device mechanically connected to one unit of said piston structure, said power device being normally deenergized and energizable for effecting relative movement of said units to said second relative position and then bodily movement of said units to generate pressure in said chamber according to energization of said power device, and a control mechanism for said power device.

22. In a hydraulic brake system for a vehicle having a master cylinder, and wheels provided with brakes having operating cylinders therefor, a power booster mechanism comprising a casing providing a pressure chamber communicating with the wheel cylinders, a movable piston structure in said casing and comprising a pair of units having limited relative movement with respect to each other and normally occupying relative positions establishing hydraulic communication between the master cylinder and the wheel cylinders, said units being relatively movable to a second relative position in which said hydraulic communication is closed and from which relative position said units are bodily movable to generate pressure in said pressure chamber, a power device mechanically connected to said piston structure, said power device being normally deenergized and energizable for effecting relative movement of said units to said second relative position and then bodily movement of said units to generate pressure in said chamber according to energization of said power device, and a control mechanism for said power device directly and opposingly subjected to the hydraulic pressure of the master cylinder and to the hydraulic pressure in the wheel cylinders to control the energization of said power device.

23. In a hydraulic braking system for a vehicle having a master cylinder, and wheels provided with brakes having operating cylinders therefor, a power-operated hydraulic booster for the braking system comprising a conduit connected to the master cylinder, a booster cylinder having one end forming a pressure chamber connected with the wheel cylinders, a piston structure reciprocable in said cylinder and comprising a pair of relatively movable units one of which is provided with a passage normally affording hydraulic communication between said conduit and the wheel cylinders, said passage being of such cross-sectional area as to afford relatively unimpeded transmission of hydraulic fluid from the master cylinder to the wheel cylinders upon initial operation of the master cylinder, the other piston unit comprising a valve for closing said passage when said piston structure moves toward said end of said booster cylinder, power means having mechanical connection with one unit of said piston structure for actuating it, said conduit communicating with the other end of said booster cylinder to subject said piston structure to the hydraulic pressure in the master cylinder when said power means is energized, and means operative upon the building up of pressure in said master cylinder for energizing said power means.

24. In a hydraulic braking system for a vehicle having a master cylinder, and wheels provided with brakes having operating cylinders therefor, a power-operated hydraulic booster for the braking system comprising a conduit connected to the master cylinder, a booster cylinder having one end forming a pressure chamber connected with the wheel cylinders, a piston structure reciprocable in said cylinder and comprising a pair of relatively movable units one of which is provided with a passage normally affording hydraulic communication between said conduit and the wheel cylinders, said passage being of such cross-sectional area as to afford relatively unimpeded transmission of hydraulic fluid from the master cylinder to the wheel cylinders upon initial operation of the master cylinder, the other piston unit comprising a valve for said passage, means for closing said valve when said piston structure moves toward said end of said booster cylinder, power means directly connected to said first named unit for actuating said piston structure, said conduit communicating with the other end of said booster cylinder to subject said piston structure to the hydraulic pressure in the master cylinder when said power means is energized, and means operative upon the building up of pressure in said master cylinder for energizing said power means.

BERTELI STELZER SHATTOCK,
*Berteli Stelzer, now by marriage Berteli Stelzer Shattock.*